United States Patent

Bertram et al.

[11] 3,872,382

[45] Mar. 18, 1975

[54] MAGNETIC FIELD MEASURING APPARATUS WITH FREQUENCY INDEPENDENT SENSITIVITY

[75] Inventors: Joachim Bertram, Bremen-Osterholz; Wilfried Meuser, Bremen, both of Germany

[73] Assignee: Fried. Krupp Gesellschaft mit beschrankter Haftung, Essen, Germany

[22] Filed: Apr. 9, 1973

[21] Appl. No.: 350,614

[30] Foreign Application Priority Data
Apr. 22, 1972 Germany............................ 2219780

[52] U.S. Cl.................................. 324/43 R, 324/47
[51] Int. Cl............................................ G01r 33/02
[58] Field of Search.................. 324/43 R, 47, 40, 8

[56] References Cited
UNITED STATES PATENTS
3,489,955   1/1970   Freeborn .............................. 324/40
FOREIGN PATENTS OR APPLICATIONS
978,745   12/1964   Great Britain..................... 324/43 R

OTHER PUBLICATIONS

Gordon et al.; Use of Operational Amplifier for Measuring Magnetic Flux Densities, Amer. Jour. of Physics, Vol. 36, No. 1, Jan. 1970, pp. 94–98.

Scholes; R., Application of Operational Amplifiers to Magnetic Measurements; IEEE Trans. on Mag., Vol. Mag-6; No. 2, June 1970, pp. 289–291.

*Primary Examiner*—Robert J. Corcoran
*Attorney, Agent, or Firm*—Spencer & Kaye

[57] ABSTRACT

A circuit arrangement for measuring very weak alternating magnetic fields including a receiver coil, having an inductive reactance and a natural ohmic resistance value, for detecting the alternating magnetic field and an electronic amplifier circuit connected in series with the receiver coil. The input resistance of the amplifier circuit is dimensioned so that, in a good approximation, it is of the same value as the natural ohmic resistance of the receiver coil but of opposite sign.

13 Claims, 4 Drawing Figures

MAGNETIC FIELD MEASURING APPARATUS WITH FREQUENCY INDEPENDENT SENSITIVITY

BACKGROUND OF THE INVENTION

The present invention relates to a circuit arrangement for measuring very weak alternating magnetic fields by employing a receiver coil with an inductance and a natural ohmic resistance and a series-connected electronic amplifier circuit.

One technique in the electrical measuring art for measuring nonelectric physical values is the technique of measuring with a magnetic field. Increasing demands exist for this technique in connection with the development of high precision systems used, for example, in physical and geophysical research and also in the materials sciences. Measuring circuits are often desired which furnish electrical measuring signals, which may be output currents or output voltages, even when the magnetic field to be measured has a low intensity, and in which the measuring signals having a linear dependence on the magnetic field to be measured without any change in the sensitivity in dependence on the frequency of the alternating magnetic field to be measured.

The presently achievable sensitivites, which are in the order of magnitude of about 1 gamma ($=10^{-5}$ Gauss; $10^{-5}$ Gauss $\approx 1.3 \cdot 10^{-3}$ Ampere per meter; for a comparison, the vertical direct field of the earth is about 20,000 gamma) with respect to the static direct magnetic fields, no longer meet many of the actual requirements. These sensitivities are generally attained with measuring probes operating according to the so-called Forster principle which can be used for direct fields and alternating fields up to about 100Hz. Their effect is based on the superposition of the direct field to be measured on an alternating magnetic field which is impressed in a magnetic core whereby a shift in the saturation of the core is produced as a result of the direct field (see, "Magnetfeldmessung mit Eisenkern-Magnetometer nach dem Oberwellenverfahren" [Magnetic Field Measurements with Iron Core Magnetometer according to the Harmonic Method] Sheet V 392-1 of the "Archiv für technisches Messen" [Archives for Technical Measurements], 1952, Germany, written by Dipl.Ing.Rudolf Kühne, Office National d'Etudes et de Recherches Aéronansiques, chatillon near Paris. An evaluation of the harmonics produced upon magnetic excitation, however, requires complicated circuitry which is a reason for the high cost of measuring instruments of this type.

For scientific precision measurements, the so-called Jolivet magnetometer and the nuclear physical magnetometer have recently become known. The costs of these two types of magnetometers, however, are generally much too high for the practice of most purposes in the measuring art. Moreover the Jolivet magnetometer is very susceptible to malfunctions for mechanical reasons and both magnetometers are not generally used for very weak useful components in magnetic fields because their sensitivity is better by hardly more than one order of magnitude than that of measuring probes operating according to the Forster principle.

The measurement of alternating magnetic fields is more sensitive, by about three orders of magnitude, than the abovementioned electrical, electromechanical and nuclear physical magnetometers, which perform a static measurement of the direct field. For this reason many measuring problems which occur in practice are solved by producing a relative movement between the measuring device and an object to be measured. This relative movement is often even unavoidable in some tasks, so that low frequency alternating fields must now be evaluated.

Such relative movement conditions exist, for example, when stationary magnetic fields of celestial bodies are to be measured by an earth satellite which rotates in order to stabilize itself. Comparable to this are the conditions when work pieces are tested as to their magnetic properties, particularly their magnetic purity. Such a testing is however, also based on a measurement of quasi direct fields, for example when the work pieces which are the objects to be measured are passed by the measuring instrument, and in particular the receiving coil of the measuring circuit.

Other methods for indirectly measuring weak direct magnetic fields by the measurement of an alternating field are also known. For example one such method is a measurement according to the generator principle by means of a rotating receiver coil (rotation or search coil magnetometer). However, the demands for precision in the practical usage of such a rotating receiver coil have also not been met with justifiable costs since high precision electromechanical arrangements are required in the construction of such rotating coils and because control problems result with respect to the required constant number of revolutions of the receiver coil.

High sensitivity with respect to the measuring of weak alternating magnetic fields is expected from a recently undertaken development in space research (the HELIOS project) in which a receiver coil, if possible without load, is connected to an electronic amplifier circuit. The open circuited output voltage from such a receiver coil is directly proportional to the frequency of the field intensity to be measured. The frequency dependent open circuited voltage of the receiver coil then becomes independent of frequency when an integrating amplifier circuit is connected in series with the receiver coil. Although this is theoretically unequivocally correct, in practice it can be utilized only within limits since the open circuited voltage at low frequencies is so small that the signal to noise ratio becomes extremely poor in the measuring signal. Therefore, this principle, i.e., the measurement of weak alternating magnetic fields by means of an open circuited receiver coil whose output signal is evaluated with an integrator, thus has the decisive drawback (as do all other conventional methods based on the measurement of alternating fields) that the sensitivity of the circuit arrangement depends on the frequency of the alternating field to be measured and becomes very poor with very low frequency alternating fields, and so-called quasi direct fields.

In view of the above, it has thus far been necessary to measure weak interplanetary direct magnetic fields with rotating receiver coils. The measuring sensitivity of such rotation magnetometers is dependent on the speed of rotation of the receiving coil. Fluctutations in the speed of rotation thus falsify the measuring result. A further drawback of the rotation magnetometer in connection with such applications is particularly that mechanical, e.g. bearing problems are difficult to master in the space art.

SUMMARY OF THE INVENTION

It is therefore the object of the present invention to overcome the drawbacks of the prior art arrangements and methods by providing a circuit arrangement which meets the requirements for frequency independent high sensitivity even with very low frequency and very weak alternating magnetic fields. Accordig to the present invention the solution of the problem of providing such a circuit arrangement is based on the consideration that in a short-circuited receiver coil — in contradistinction to comparable circuit arrangements — the short circuit current is proportional to the field intensity of the alternating magnetic field to be measured and theoretically independent of its frequency because the open circuited voltage as well as the inductive reactance of the receiver coil is proportional to the frequency of the magnetic field. The coil short-circuit current, i.e., the quotient of the short-circuit voltage and the inductive reactance, should then be frequency independent. The present invention is based on the realization that this theoretically expected frequency independence does not occur in the practical realization of such circuit arrangements because the ohmic internal resistance with respect to the inductive reactance of the receiver coil can no longer be considered negligible at low frequencies.

According to the basic idea of the present invention, the solution to the problem is to use a short-circuited receiver coil with a negligibly low internal resistance. In low temperature physics such so-called superconductive coil arrangements have already been used in an experimental manner. However, due to the high expenditures involved, such arrangements are suited only for demonstration and study purposes to demonstrate and study the physical effects of superconduction, and any use thereof for practical measuring instruments is inconceivable in the foreseeable future.

The above-described problem on which the present invention is based and the principal idea of its solution are therefore solved according to the present invention by a circuit arrangement having a receiver coil connected to the input of an electronic amplifier circuit which has, in a good approximation, a resulting input resistance which is as high, but has the opposite polarity, as the ohmic internal or natural resistance of the receiver coil.

The solution of the present invention thus utilizes active two-terminal networks which are known to be realized in the electronic circuit art and which under given conditions have a negative voltage-current ratio. The suitably dimensioned electronic amplifier circuit connected behind the receiver coil thus effects a compensation of the ohmic internal resistance of the receiver coil (which ohmic internal resistance in unavoidable in a nonideal receiver coil) so that now the coil is forced, in a good approximation, to behave like a superconductive coil.

By means of the present invention, the limits on the use of conventional alternating field magnetometers whose sensitivity, being proportional to the frequency of the alternating field to be measured, could no longer produce an evaluable measuring signal from weak fields having very low frequencies, have now been overcome. It is therefore possible with the present invention to even measure extremely weak and thus very low frequency magnetic fields, (i.e., also quasi direct fields) with a uniform high sensitivity independent of frequency and over a wide frequency range.

According to the preferred embodiment of the invention, an electronic amplifier circuit is used which includes an operational amplifier which is provided with a feedback connection and which has two inputs with opposite polarity. It is known that the electronic analog art that such operational amplfiers have an open circuited amplification which tends toward the value "infinite" and which can be adjusted to a finite, stable value by feedback connections. This operational amplifier, which has a negative and a positive input with respect to its output, is provided with a feedback resistance connected between the output and the negative input, and with a regenerative feedback resistance connected between the output of the operational amplifier and the positive input thereof. The receiver coil is connected to the negative input of the operational amplfier and an input resistance is connected between the positive input of the operational amplifier and a point of zero reference potential which is common to the input and the output of the amplifier circuit. With this arrangement the effective input resistance of the electronic amplifier circuit is then exactly the same as the ohmic internal resistance of the receiver coil — but with the opposite sign — if the ratio of the product of the input resistance and feedback resistance to the regenerative feedback resistance is equal to the ohmic internal resistance of the receiver coil.

An analysis of the thus constructed and dimensioned circuit arrangement which will be described below will show that the measuring signal now depends only on the field intensity of the alternating magnetic field to be measured and no longer on its frequency which may be as low as desired.

If the measuring system according to the invention is enlarged to include a two-stage electronic amplifier circuit wherein the first stage is dimensioned according to the above-outlined requirements, it is then possible to measure not only extremely weak magnetic field intensities without any frequency dependence, but also to design these circuit arrangements for a very wide dynamic range of the alternating magnetic fields to be measured. With a conceivably inexpensive instrument, since no special circuit connected difficulties are involved, it is possible to realize, with a given lower frequency limit of, for example $10^{-3}$ Hz, as will be explained, a field intensity measuring range of $10^{-8}$ to $10^{+4}$ Gauss.

According to an advantageous further embodiment of the invention a frequency dependent coupling for example a high pass filter, is provided between the stages of a, for example, two-stage amplifier circuit. It is then possible, for example, to obtain, with only a single receiver coil, (a) a signal containing all frequency components of the alternating field at the output of the first stage, (b) a signal containing the components of the higher frequency alternating fields at the output of the second stage (which preferably has a gain of "one"), and (c) a signal which indicates the intensity of low frequency alternating fields (quasi direct fields) between the outputs of the two stages. In contradistinction to the above, it was previously necessary, in order to separately cover both low and high frequency magnetic fields, to operate separate complete measuring instruments for each frequency range of interest.

A further positive property of the circuit arrangement according to the present invention is the fact that the sensitivity of the circuit arrangement substantially depends on the amplifier circuit and no — as in the open circuited coil — substantially on the number of windings of the receiver coil. Thus the optimum number of windings can be selected merely based on the requirements of a stable amplifier circuit which even increases the various fields of application for the present invention.

It can be appreciated that an accurate maintenance of the above-mentioned matching requirements between the resistances connected to the operational amplifier and the internal or natural resistance of the receiver coil may produce unstable behavior of the amplifier circuit. In order to make the system safe from these instabilities, it is advantageous to maintain a certain residual deviation from the ideal dimensions. This residual deviation then requires a lower frequency limit for the measuring arrangement which is determined by the circuitry involved.

The resulting special advantage of the circuit arrangement according to the present invention in the practice of the measuring art is that it is possible to detect alternating magnetic fields without otherwise required measures for producing a free magnetic space, wherein the field intensity of the detected fields is only a fraction of the effective field intensity fluctuations of the magnetic field of the earth surrounding the location of the measurement. By providing an additional settable ohmic resistance, preferably in parallel with the grounded input resistance of the operational amplifier into the, in itself matched, electronic amplifier circuit, the effective lower frequency limit of the entire circuit arrangement can be set according to the environmental conditions to be excluded.

Thus, by virtue of a circuit arrangement according to the invention there is obtained the advantageous possibility of performing precision measurements without providing particular means for excluding — as it is required in known d.c. field magnetometers — the earth field forces which undergo slow changes. Furthermore, such precision measurements can be performed in a frequency range which normally could be detected only by d.c. field magnetometers, with the usual inclusion of all superposed interference effects.

The influence of fluctuations in the magnetic field of the earth above the lower frequency limit, which (due to the environmental conditions in areas which are not magnetically shielded), are superimposed as a homogeneous interfering field on an inhomogeneous alternating magnetic field to be measured, can be easily eliminated according to a further feature of the circuit arrangement according to the present invention, by dividing the receiver coil into two series connected half coils which are arranged coaxially to one another at a predetermined distance and have their respective windings arranged so that they go in opposite directions relative to one another. Thus, the known technique for the field intensity gradient measurement is realized directly without the otherwise required use of differential amplifiers.

Interplanetary direct and alternating magnetic fields can also be measured with particular advantage by the circuit arrangement according to the present invention since it is able to replace the functions of the rotation magnetometer for sensitive direct field measurements as well as the function of open circuited receiver coil at rest for alternating field measurements and is superior to both methods with respect to measuring accuracy and the simplicity of the circuitry involved.

DETAILED DESCRIPTION OF THE PREFERRED EMBODIMENTS

Figure 1:
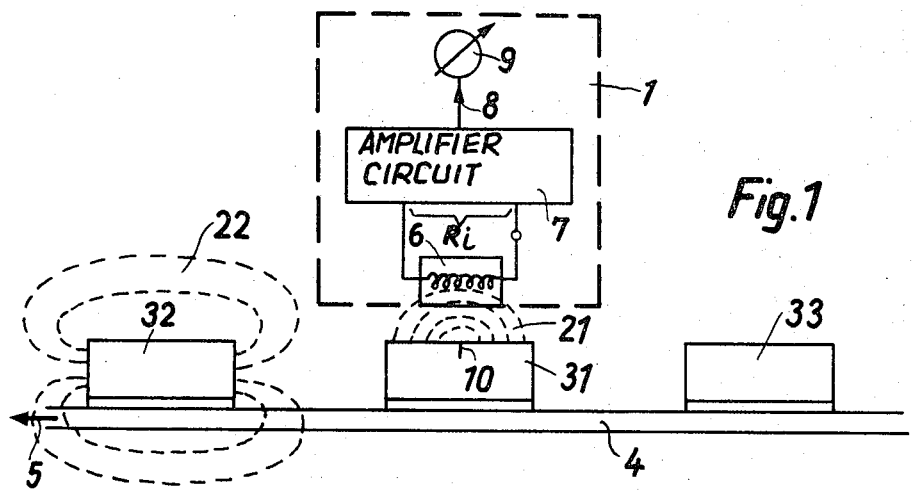
FIG. 1 is a basic schematic illustration of the use of the present invention for the testing of magnetic material.

Referring now to FIG. 1 there is shown a basic sketch for the use of a circuit arrangement 1 according to the present invention for measuring even extremely low frequency and weak alternating magnetic fields e.g. quasi direct fields 21 and 22 as an aid in the testing of materials. In the illustrated example, the objects whose magnetic fields are to be measured are work pieces 31, 32, 33 which are to be magnetically tested and which are moved past the circuit arrangement 1 by means of a transporting device 4 in the direction of arrow 5. The circuit arrangement 1 includes a receiver coil 6 with a series-connected electronic amplifier circuit 7 which emits an output signal according to the measured intensity of the fields 21, 22 at its output 8 to which is connected an indicator or warning device 9. Each magnetic field 21, 22 possibly emanating from one of the objects to be tested, i.e., work pieces 31, 32, 33, penetrates the receiver coil 6. Even if these fields 21, 22 are direct or d.c. fields, due to the relative movement between the receiver coil 6 and work pieces 31, 32, 33, the circuit arrangment 1 will still indicate a quasi direct field, i.e., a very low frequency alternating magnetic field, the frequency of which is influenced by the speed of advancement of the transporting device 4.

As is known from the materials science, a field 21 such as that emanating from the work piece 31 of ferromagnetic material (FIG. 1) is indicative of a crack 10 in its surface.

The circuit arrangement 1 of the present invention gains particular importance when work pieces are tested for magnetic purity, since even very bulky, large test objects can be moved slowly past the receiver coil 6 and possible fluctuations in the speed of this movement will have no influence on the accuracy of the measuring result. In a magnetically pure work piece, e.g. work piece 33, no inherent magnetic field should occur, in contrast to the conditions sketched in the left-hand portion of FIG. 1 for work piece 32.

The circuit arrangement 1 according to the present invention now makes it possible to measure even the weakest magnetic fields with extremely low frequencies which penetrate the receiver coil 6 without the sensitivity of the measurements being influenced by the frequency and thus by the translation or rotation speed of the field 21, 22 to be measured.

Figure 2:
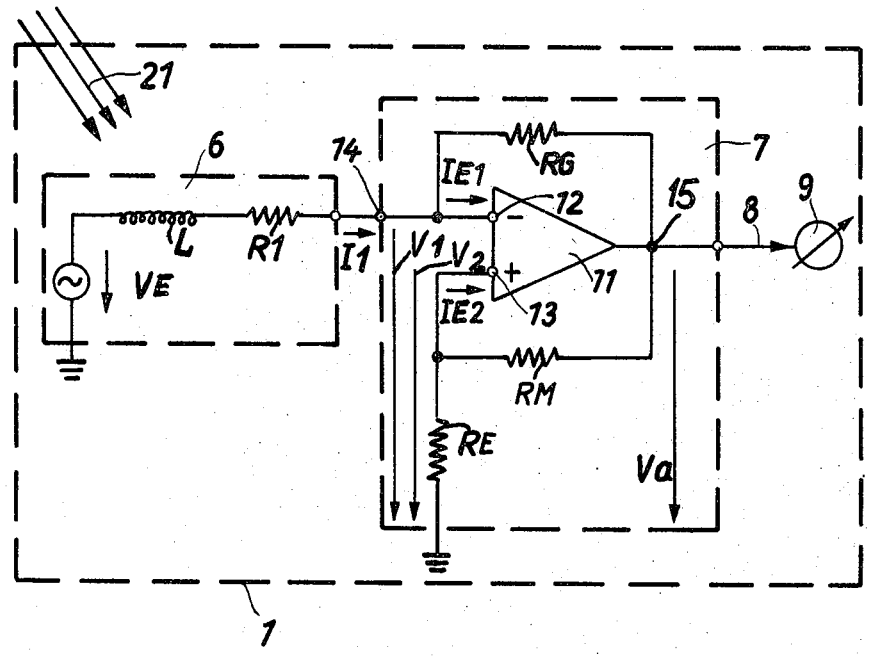
FIG. 2 is a schematic circuit diagram of the basic circuit according to the present invention including a receiver coil and series-connected single-stage electronic amplifier circuit.

The circuit arrangement 1 according to the present invention is shown in detail in FIG. 2 in its basic embodiment. In FIG. 2 the receiver coil 6 is shown, as in the custom in equivalent circuit diagrams in the electrical engineering art, divided into its inductance L and its inherent or natural ohmic resistance R1, the inductive reactance $j\omega L$ of inductance L being known to depend on the circuit frequency $\omega$ of the alternating field, e.g. field 21 to be measured. The voltage induced in receiver coil 6 by the field 21 penetrating receiver 6, i.e., the field to be measured, is considered as an impressed voltage VE.

The electronic amplifier circuit 7 connected in series with the receiver coil 6 substantially includes an operational amplifier 11 known from the electronic circuit art, i.e., an active amplifying element which is characterized by a theoretically infinite gain G. The idealization of an infinite gain G permitted in the usual operational ranges for the arithmetic treatment of such electronic operational amplifiers 11 means that the input current IE1 at the negative input 12 and the input current IE2 at the positive input 13 are negligibly small and that the input voltage V1 at the negative input 12 is the same as the input voltage V2 at the positive input 13. That is, $$G \rightarrow \infty;\ IE1 = IE2 \rightarrow 0;\ V1 = V2$$

(1)

In order for the operational amplifier 11 to operate stably, as is known, suitable connections must be made. Accordingly, as shown in FIG. 2, the operational amplifier 11 is provided with a feedback resistance RG connected between the negative input 12 and the output 15, a regenerative feedback resistance RM connected between the positive input 13 and the output 15, and an input resistance RE connected between the positive input 13 and a point of zero reference potential; i.e., ground, which is common to the input 14 and the output 8 of the amplifier circuit 7. The receiver coil 6 is connected between the negative input 12 and circuit ground. It is further known from the electronic circuit art that the relationship between the feedback resistance RG and the drop resistance, which in the illustrated embodiment of FIG. 2 is identical with the natural ohmic resistance R1 of the receiver coil 6, or the relationship of the regenerative feedback resistance RM to the ground resistance RE predetermines the effective voltage gain of the entire electronic amplifier circuit 7.

The particularly advantageous property of this amplifier circuit 7 together with a predeterminable receiver coil 6, whereby it is able to theoretically measure even the weakest alternating magnetic fields, e.g., field 21 in FIG. 2, at any desired low frequency independent of the frequency and with high sensitivity, is particularly attained when the resulting input resistance of the amplifier circuit 7, which input resistance is symbolically indicated in FIG. 1 as Ri, is of the same value but of the opposite sign as the natural ohmic resistance R1 of the receiver coil 6. This relationship indicates ideal short-circuit operation of the inductance L of the receiver coil 6 and is secured in particular when the operational amplifier 11 is connected in such a manner that the product of the feedback resistance RG and the ground resistance RE is exactly equal to the product of the regenerative feedback resistance RM and the natural ohmic resistance R1 of the available receiver coil 6.

That the above-described circuit arrangement according to the present invention produces the optimum effect will now be verified by an analysis of the resulting circuit.

From the so-called "Kirchoff Rules" the relationships between the input voltage V2 and the output voltage Va of the operational amplifier 11 can be derived and accordingly, the relationships according to the following equations apply for the permissible fiction of an ideal operational amplifier 11 as summarized in equation 1 above and for a coil current I1 furnished by the receiver coil 6.

$$V2/Va = RE/RE+RE;\ V1 = V2\ \text{from Equation (1)}$$

(2)

$$I1 \cdot (R1 + j\omega L) = VE - V1$$

(3)

$$I1 \cdot (RG) = V1 - Va$$

(4)

By combining these relationships and by employing the known induction equation for the voltage induced in a coil $$VE = j\omega K \cdot H\ \text{where}\ K = \mu_o\ n\pi/4d^2$$

(5)

wherein K is the coil geometry constant which includes the permeability $\mu_o$, the number of windings and the diameter d of a circular receiver coil 6, the following relationship results between the output voltage Va of the operational amplifier 11 i.e., the signal between the output 8 and ground, and the magnetic field intensity H of the field 21 to be measured.

$$Va = -j\omega RG \cdot (RM+RE)/j\omega L \cdot RM+(RM \cdot R1-RG \cdot RE) \cdot K \cdot H$$

(6)

This relationship contains a frequency dependence due to the circuit frequency $\omega$ of the field 21 to be measured. This frequency dependence is eliminated, according to the present invention, when the relationship between the resistance connected to the operational amplifier 11 and the natural resistance of the receiver coil 6 is as follows:

$$RE \cdot RG = RM \cdot R1;\ R1 = RG \cdot RE/RM$$

(7)

By substituting this value of R1 into equation (6) the following relationship results:

$$Va = -(RM+RE) \cdot RG/RM \cdot L \cdot K \cdot H$$

(8)

From equation (8) it can obviously be seen that the output voltage Va becomes independent of the frequency of the field intensity H to be measured, and thus a circuit arrangement has been found which, due to its frequency independent sensitivity, is also suited to measure previously undetectable weak low frequency alternating magnetic fields without any loss in sensitivity.

This important result, according to which frequency dependence can be completely eliminated, also indicated with respect to the circuitry involved, that in the case of the special dimensioning of the resistances of the circuit as indicated in equation (7), the entire electronic amplifier circuit 7 connected to the receiver coil 6 can be replaced by a fictitious ohmic input resistance $Ri$ (see FIG. 1) of the same size but opposite sign as the natural ohmic resistance R1 of the receiver coil 6 whereby the voltage VE impressed via the inductance L now operates directly toward a genuine short circuit. This can be verified for the dimensions based on the relationships set forth above if it is assumed that the quotient of input voltage V1 of the operational amplifier 11 and coil current I1 of the receiver coil 6 is equal to the effective input resistance Ri of the amplifier circuit 7, i.e.

$$Ri = V1/I1 \quad (9)$$

If the relationships of equation (2) and equation (3) are substituted into equation (9) and then equation (6) is considered, the following equation results:

$$Ri = RG \cdot RE/RM \quad (10)$$

A comparison of equation (10) with the dimensioning conditions according to the invention set forth in equation (7) shows that the effective input resistance Ri of the amplifier circuit 7 is indeed equal to the natural ohmic resistance R1 of the receiver coil 6, but with a negative sign so that the latter is completely compensated.

Consequently when the conditions of equation (7) are met, the magnetic field, e.g. field 21 in FIG. 2, penetrating the receiver coil 6 furnishes a short-circuit current $$I1 = VE/j\omega L + R1 + Ri \quad (11)$$

which short-circuit current I1 has no frequency dependence. That is, the short-circuit current I1 is strictly proportional to the field intensity H to be measured, as shown by the following equation which results from the substitution in equation (11) of the quantities defined in equations (5), (7) and (10).

$$I1 = K/L \cdot H \quad (12)$$

Considerations regarding the stability of such an amplifier circuit 7 will be considered below.

Figure 3:
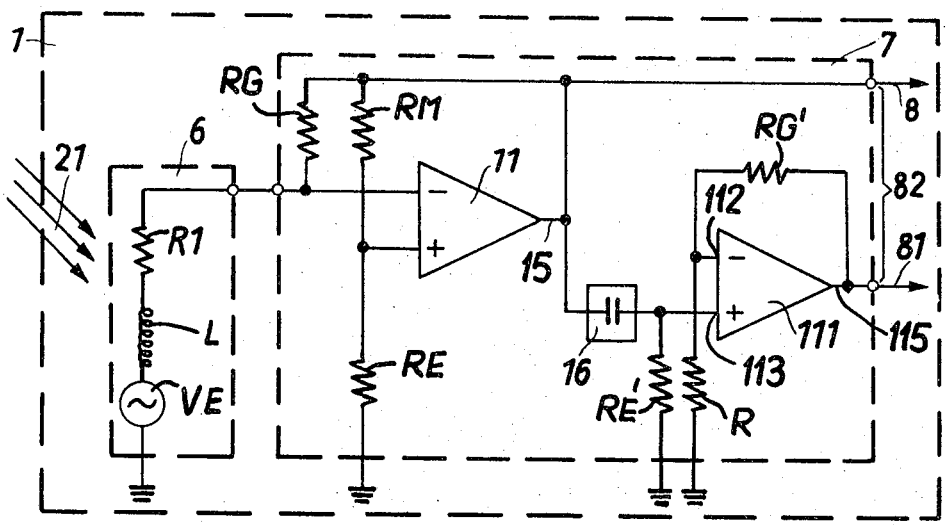
FIG. 3 is a schematic diagram of a modification of the embodiment of FIG. 2 including a two-stage, frequency dependently coupled electronic amplifier circuit.

Referring now to FIG. 3 there is shown a further embodiment of the basic circuit according to FIG. 2 of the present invention makes it possible, due to the multiple stage construction of the electronic amplifier circuit 7, to separate measuring signals from higher frequency alternating fields from those measured in the lower frequency range and, since those signals from higher, frequency alternating fields, in many cases, have a relatively low amplitude, to additionally amplify them at the same time.

As shown in FIG. 3, the amplifier circuit 7, in addition to a first stage, which includes the operational amplifier 11 and its connected resistances RG, RM and RE which are dimensioned as discussed with regard to FIG. 2, is provided with a second stage including a further operational amplifier 111 having a feedback resistance RG' connected between its negative input 112 and its output 115, an input resistance RE' connected between its positive input 13 and the point of zero reference potential i.e., ground, and a further resistance R connected between its negative input 113 and ground. Preferably, the second amplifier stage is a non-inverting amplifier stage, i.e., one which does not produce a change in sign between the input and output. This is accomplished according to the illustrated embodiment by connecting the output 15 of the operational amplifier 11 to the positive input 113 of the operational amplifier 111.

As further shown in FIG. 3, a frequency dependent coupling 16 having a high pass characteristic, here illustrated as a simple capacitive coupling, is connected between the output 15 of operational amplifier 11 and the input 113 of operational amplifier 111. With this arrangement, the same signal measured with respect to ground appears at the output 15 of the operational amplifier 11 of the first stage as in the embodiment of FIG. 2. This signal, which is an indication of the resulting field intensity H of the field 21 under consideration of all frequency components contained therein, consequently also appears at the output 8 of the amplifier circuit 7. However as a result of the high pass coupling 16, the signal measured with respect to ground appearing at the output 115 of the second stage, i.e., the operational amplifier 111, and consequently at the second output 81 of the amplifier circuit 7. represents only such field intensities which originate from high frequency components of the field 21 to be measured. Since as mentioned above in the illustrated embodiment of FIG. 3 the second stage of the amplifier circuit 7 is a non-inverting stage, this expanded circuit arrangement 1 additionally furnishes a measuring signal which represents exclusively the low frequency field components when the measurement takes place between outputs 8 and 81 as indicated by the reference numeral 82. Preferably, when all three of these signals are desired, the operational amplifier 111 is provided with a gain of "one." Thus it is possible with this single and uncomplicated circuit arrangement 1 to make simultaneous magnetic field measurements in extremely different frequency ranges.

Regarding the circuit arrangement 1 of the present invention, a consideration of frequency limits is of interest with which, in the present case, even a further advantageous application of the present invention can be shown. These considerations are again made with reference to the embodiment of FIG. 2 or the first amplifier stage of the embodiment of FIG. 3, respectively.

An upper frequency limit, i.e., the highest frequency of alternating magnetic fields which can still be measured with the circuit arrangement 1, is not determined by the circuit arrangement 1 of the present invention per se, but only by the upper frequency limit of the operational amplifier 11 used in the electronic amplifier circuit 7.

Considerations regarding the lower frequency limit $\omega_u$ to be observed in the practical realization of the circuit are connected with a consideration of the stability of the operational amplifier 11 which considerations are based on the following transfer function equation which results from equation (6):

$$V_a = -\frac{(RE+RM)}{RM} \cdot \frac{RG}{L} \cdot K \cdot H \cdot \frac{j\omega}{j\omega + \frac{R1 \cdot RM - RG \cdot RE}{L \cdot RM}} \quad (13)$$

A stabilization criterion known from the function theory of amplifiers requires that the real portion and the imaginary portion of the complex term in the denominator of the transfer function equation (13) must have the same sign, and the real portion must thus be greater than or equal to zero. In order for the stability of the amplifier circuit 7 of FIG. 2 to be assured in practice, the product of the natural resistance R1 and the regenerative feedback resistance RM must be greater by a slight amount than the product of the feedback resistance RG and the input resistance RE, i.e., a certain deviation from the ideal matching condition of equation (7) is permissible for reasons of stable operation of the amplifier circuit 7. Thus the lower frequency limit $\omega_u$ of the circuit is defined as follows:

$$\omega_u = R1 \cdot RM - RG \cdot RE/L \cdot RM \quad (14)$$

This deviation from the ideal matching conditions of equation (7) permitted in the realization of the present invention is required in the interest of a stable circuit arrangement 1 because of the inadequacies of real operational amplifiers 11 and because of long-time changes in the components included therein.

It should be noted that even with a very simple laboratory structure according to FIG. 2 merely for demonstration of the operability of the circuit arrangement 1 according to the present invention, i.e., without the use of specially selected components for the construction of the electronic amplifier circuit 7, and with a simply wound receiver coil 6 without any consideration of particularly high quality of the coil, i.e., a coil 6 having an inductance L = 20 Henry and a natural ohmic resistance R1 of 1.5 kOhm; a lower frequency limit $\omega_u$ of 10mHz was reached with RG = 100 kOhm and Rm = 1.5 kOhm. This value could never even approximately be attained with any other known measuring arrangement in spite of considerably higher costs.

Considerations toward optimizing the realization of the solution of the present invention have shown that the use of receiver coils with higher coil qualities and of good operational amplifiers 7 permits the attainment of lower frequency limits $\omega_u$ which lie lower by at least one order of magnitude than the above result. A calculated estimate of the sensitivity of a circuit arrangement according to FIG. 2 results, with respect to the field intensity H to be measured, in a sensitivity dynamic between $10^{-6}$ and $10^{+6}$ amperes per meter (1.25 · $10^{-3}$ amperes per meter corresponds approximately to 1 gamma; in comparison: the field intensity of the earth in Western Europe is approximately 70 amperes per meter ) as the dynamic range even of the lowest frequency alternating magnetic fields which can be detected with the aid of the present invention.

A further consideration regarding optimization leads to the realization that it would be advanageous in the interest of a very high sensitivity of the circuit arrangement 1, to design the receiver coil 6 with a diameter of d which is as large as possible and a number of windings n which is as low as possible. This result meets the desire in practice of being able to realize a versatile measuring circuit with as little cost as possible. However, these latter considerations regarding optimization have limits in practice. Thus, the matching conditions will have to be met with more critical accuracy as the natural ohmic resistance R1 of the receiver coil 6 connected to the input the electronic amplifier circuit 7 becomes smaller. Moreover, the load limit of commercially available operational amplifiers 11 prohibits an extremely low natural ohmic resistance R1 since, with a given effective gain in the operational amplifier 11, the feedback resistance RG would then have to be correspondingly reduced.

With the aid of the measuring circuit according to the invention, it is thus possible, in a much simpler and less expensive manner than the previous measuring instruments for precision measurements, to advance to previously unreachable regions in the magnetic measuring art. Since even with a very low frequency of the alternating magnetic field to be measured, even the lowest field intensities H can be measured independent of the frequency, it is now possible to construct extremely slowly rotating search coil magnetometers for indirect d.c. or direct field measurements so that the above-mentioned difficulties regarding the constancy of a high number of revolutions and the mechanical problems connected therewith are overcome. When the circuit arrangement of the present invention is used in space probes which perform approximately one revolution per second for their spin stabilization, it is possible with this relatively simple circuit arrangement to measure interplanetary magnetic fields from the space probe, the receiver coil 6 now being firmly connected with the space probe. The significance of the measurement of even weak magnetic fields in the materials science is known and is now no longer is necessary to place special requirements on the precise maintenance of a certain speed for the passage of work pieces past the measuring arrangements when tests are being made for magnetic purity. Finally, when the present application is used in the road traffic measuring art, the problems occurring when magnetic field measuring probes were embedded in the road covering to count vehicles and would not furnish a counting pulse when a vehicle did not travel over them at a certain minimum speed and/or did not have a distinct magnetic stray field, are overcome.

Figure 4:
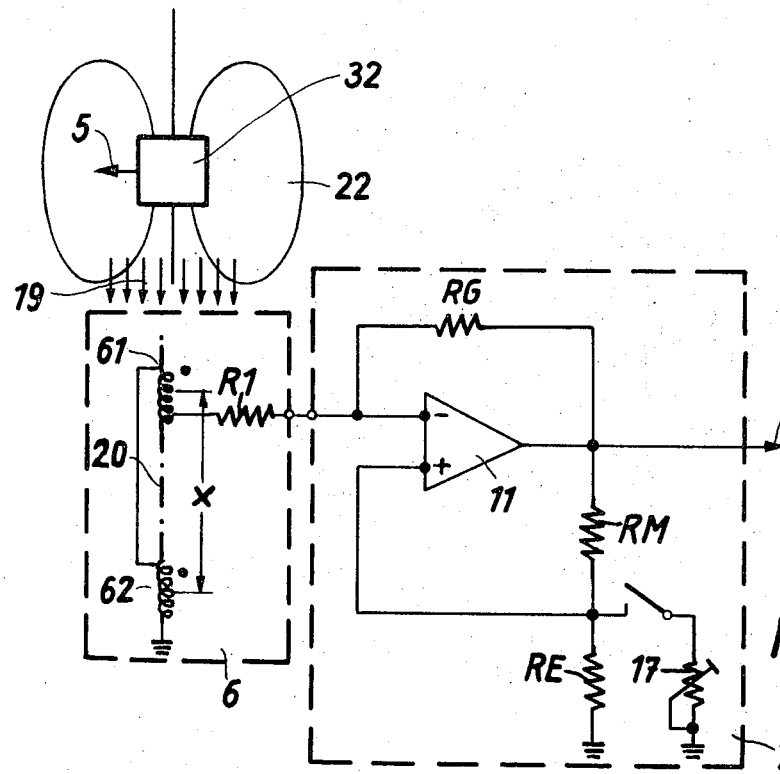
FIG. 4 is a schematic circuit diagram showing further modifications of the circuit arrangement of FIG. 2.

It has already been noted that when the matching condition of equation (7) is not met, a lower frequency limit $\omega_u$ appears below which the measuring signal appearing at output 8 is no longer independent of the frequency. This, however, provides the simple possibility, as shown in FIG. 4, of setting the lower frequency limit $\omega_u$ by means of an adjustable additional ohmic resistance 17 connected in parallel with the grounded input resistance RE, so that extremely low frequency interfering fields (even inhomogeneous fields) which clearly lie below the frequency of the fields 22 to be measured can have no influence on the measuring signal appearing at output 8 because of the appropriately set lower limit frequency $\omega_u$. Such extremely low frequency interfering fields are produced, for example, by the daily fluctuations of the magnetic field of the earth (see "Einführung in die Geophysik" [Introduction to Geophysics] by Walter Kertz, Hochschultaschenbuch [college pocket book edition] Bibliographisches Institut

[publisher], 1971). The interfering influence of such low frequency fields on precision measurements can thus be effectively suppressed by means of this embodiment of the present invention. The same effect can be realized by an additional variable longitudinal resistance in series with the receiver coil 6. In such case, however, it would be advisable, in order to prevent a change in the effective gain of the connected operational amplifier 11, to also make the feedback resistance RG uniformly variable.

The above-mentioned earth field compensation fails, however, when the useful signals to be measured have such low frequencies that they fail into the frequency range of the higher frequency fluctuations of the earth's field.

According to a further feature of the present invention this problem is solved in a manner which eliminates complicated and expensive shielding measures for most of the practical measuring problems, while nevertheless furnishing highly precise field measurements. This solution is based on the realization that the interfering components of the earth's field are present as homogeneous fields 19 (See FIG. 4) while compared thereto the fields 22 to be measured, for example of a work piece 32 which is to be tested for its magnetic purity, must be considered to be inhomogeneous in comparable geometric associations. In order to take advantage of these conditions, as shown in FIG. 4, the receiver coil 6 is divided in two equal portions or half coils 61 and 62 which are coaxially arranged at a defined distance $x$ from one another on a longitudinal axis 20 and are connected in series with opposite polarity i.e., in series opposition.

With this modification of the receiver coil 6, it is possible to directly measure the gradient of magnetic fields, i.e., without the additional circuits for forming differences between two measured values at different points of a magnetic field which are usually required. In both half coils 61 and 62 the same amount of induction takes place but with opposite polarities so that no signal reaches the amplifier circuit 7 from this homogeneous field 19. Thus only those alternating magnetic fields, e.g. field 22 in FIG. 4, are measured which have a gradient between the locations of the two half coils 61 and 62 and thus are not constant over the distance $x$ between the two half coils 61 and 62.

It will be understood that the above description of the present invention is susceptible to various modifications, changes and adaptations, and the same are intended to be comprehended within the meaning and range of equivalents of the appended claims.

We claim:

1. In a circuit arrangement for detecting very weak alternating external magnetic fields "and for measuring same with a sensitivity which is independent of the frequency of the field", including a receiver coil, having no iron core and having an inductive reactance and a natural ohmic resistance, for inductively detecting the external magnetic field, and an electronic amplifier circuit connected in series with the receiver coil, the improvement wherein the input resistance of said amplifier circuit is, in a good approximation, of the same values but of opposite sign as said natural ohmic resistance of said receiver coil.

2. A circuit arrangement as defined in claim 1 wherein said amplifier circuit includes at least an operational amplifier having a feedback connection.

3. A circuit arrangement as defined in claim 2 wherein: said operational amplifier has a positive input and a negative input; said receiver coil is connected to said negative input; an input resistor is connected between said positive input and a point of zero reference potential for said amplifier circuit; said feedback connection comprises a first feedback resistance connected between the output of said operation amplifier and said negative input and a second regenerative feedback resistance connected between said output of said operational amplifier and said positive input; and said input resistor and said first and second feedback resistances are dimensioned so that the ratio of the product of said input resistor and said first feedback resistance to said second regenerative feedback resistance is of the same approximate value as said natural ohmic resistance of said receiver coil.

4. A circuit arrangement as defined in claim 3 wherein said amplifier circuit includes a plurality of stages.

5. A circuit arrangement as defined in claim 4 wherein said amplifier circuit includes at least one frequency dependent coupling between adjacent stages.

6. A circuit arrangement as defined in claim 5 wherein said frequency dependent coupling has a high pass characteristic.

7. A circuit arrangement as defined in claim 6 wherein: said amplifier circuit includes first and second amplifier stages with said operational amplifier, said input resistor and said first and second feedback resistances constituting said first stage; said second stage is a non inverting amplifier stage having its input connected to the output of said operational amplifier via said frequency dependent coupling; and, said amplifier circuit has a first output terminal connected to said output of said operational amplifier and a second output terminal connected to the output of said second amplifier stage.

8. A circuit arrangement as defined in claim 7 wherein said second amplifier stage of said amplifier circuit has a gain of One.

9. A circuit arrangement as defined in claim 8 wherein said second amplifier stage includes a further operational amplifier whose positive input is connected to the output of said frequency dependent coupling.

10. A circuit arrangement as defined in claim 3 further comprising means for providing a selectable lower frequency limit for said amplifier circuit.

11. A circuit arrangement as defined in claim 10 wherein said means for providing a selectable lower frequency limit includes an adjustable additional resistance connected in parallel with said input resistor.

12. A circuit arrangement as defined in claim 11 wherein said receiver coil comprises two series connected portions, each of which constitutes one half of the coil, the windings of said portions being arranged in mutually opposite directions, and said portions being positioned along a common longitudinal axis at a defined distance from one another.

13. A circuit arrangement as defined in claim 1 wherein said receiver coil comprises two series connected portions, each of which constitutes one half of the coil, the windings of said portions being arranged in mutually opposite directions, and said portions being positioned along a common longitudinal axis at a defined distance from one another.

* * * * *